United States Patent
Tait

(10) Patent No.: US 11,110,833 B2
(45) Date of Patent: Sep. 7, 2021

(54) THERMAL-TRANSFER COMPONENT FOR A VEHICLE SEAT

(71) Applicant: Faurecia Automotive Seating, LLC, Auburn Hills, MI (US)

(72) Inventor: Shaun D. Tait, Auburn Hills, MI (US)

(73) Assignee: Faurecia Automotive Seating, LLC, Auburn Hills, MI (US)

(*) Notice: Subject to any disclaimer, the term of this patent is extended or adjusted under 35 U.S.C. 154(b) by 304 days.

(21) Appl. No.: 16/116,061

(22) Filed: Aug. 29, 2018

(65) Prior Publication Data

US 2019/0061575 A1 Feb. 28, 2019

Related U.S. Application Data

(60) Provisional application No. 62/552,419, filed on Aug. 31, 2017.

(51) Int. Cl.
*B60N 2/56* (2006.01)
*F25B 21/04* (2006.01)

(52) U.S. Cl.
CPC ......... *B60N 2/5642* (2013.01); *B60N 2/5614* (2013.01); *B60N 2/5678* (2013.01); *B60N 2/5692* (2013.01); *F25B 21/04* (2013.01)

(58) Field of Classification Search
CPC .. B60N 2/5642; B60N 2/5678; B60N 2/5692; F28D 15/0275; B60H 1/00478; B60H 1/0285; F25B 21/04; F25B 2321/021; F25B 2321/025; F25B 2321/0251; F25B 2321/0252
See application file for complete search history.

(56) References Cited

U.S. PATENT DOCUMENTS

| | | | | |
|---|---|---|---|---|
| 5,626,021 A * | 5/1997 | Karunasiri | ............... | A47C 7/74 236/49.3 |
| 5,924,766 A * | 7/1999 | Esaki | ...................... | A47C 7/74 297/180.13 |
| 7,059,137 B2 * | 6/2006 | Childress | ............ | B60H 1/00264 62/259.2 |
| 8,893,329 B2 * | 11/2014 | Petrovski | ............. | A47C 31/008 5/423 |
| 9,403,460 B2 * | 8/2016 | Hickey | ................ | B60N 2/5628 |
| 10,252,650 B2 * | 4/2019 | Perraut | ................ | B60N 2/5635 |
| 2004/0244950 A1 * | 12/2004 | Zhou | ..................... | H01L 23/427 165/104.21 |
| 2005/0161193 A1 | 7/2005 | McKenzie | | |
| 2006/0273646 A1 * | 12/2006 | Comiskey | ............ | B60N 2/5628 297/408 |
| 2006/0284455 A1 * | 12/2006 | Terech | ................. | B60N 2/5685 297/180.14 |
| 2007/0214800 A1 * | 9/2007 | Kadle | .................. | B60N 2/5635 62/3.3 |

(Continued)

FOREIGN PATENT DOCUMENTS

WO 2017066244 4/2017

*Primary Examiner* — Emmanuel E Duke
(74) *Attorney, Agent, or Firm* — Barnes & Thornburg LLP

(57) ABSTRACT

An occupant support comprises a vehicle seat including a cushion and trim positioned around at least a portion of the cushion. The occupant support includes an occupant-comfort system having a heat transfer station positioned in the seat cushion in spaced-apart relation to the trim and configured to move selectively heat to an occupant in a heating mode and away from the occupant in a cooling mode.

15 Claims, 4 Drawing Sheets

(56) References Cited

U.S. PATENT DOCUMENTS

2009/0193814 A1     8/2009   Lofy
2012/0012281 A1*   1/2012   Franz .................... H01L 23/427
                                                                           165/104.26
2016/0129817 A1*   5/2016   Shimizu ............... B60H 1/2227
                                                                              219/202
2016/0304013 A1* 10/2016   Wolas .................. B60N 2/5657
2016/0325657 A1* 11/2016   Zhang .................. B60N 2/5692
2018/0229632 A1*   8/2018   Line ........................ F25B 21/02

* cited by examiner

THERMAL-TRANSFER COMPONENT FOR A VEHICLE SEAT

PRIORITY CLAIM

This application claims priority under 35 U.S.C. § 119(e) to U.S. Provisional Application Ser. No. 62/552,419, filed Aug. 31, 2017, which is expressly incorporated by reference herein.

BACKGROUND

The present disclosure relates to an occupant support, and particularly to an occupant support configured to provide cooling and warming sensation to an occupant resting on the occupant support. More particularly, the present disclosure relates to an occupant support with a thermal-transfer component included in the occupant support.

SUMMARY

According to the present disclosure, an occupant support comprises a vehicle seat including a cushion and trim positioned around at least a portion of the cushion. The occupant support includes an occupant-comfort system having a heat transfer station positioned in the seat cushion in spaced-apart relation to the trim and configured to move selectively heat to an occupant in a heating mode and away from the occupant in a cooling mode. A heat conductor is coupled to the heat transfer station and configured to communicate heat between the heat transfer station and the occupant. A heat sink located in spaced-apart relation to the cushion and the heat transfer station and configured to remove heat from the heat transfer station while the occupant-comfort system is in the cooling mode.

In some embodiments, the heat transfer station includes a heat mover coupled to the conductor and a heat exchanger interconnecting the heat exchanger and the heat sink. The heat exchanger is configured to remove heat from the heat transfer station. The heat exchanger has a working fluid preselected to operate over a range of environmental temperatures including environmental freezing temperatures.

In some embodiments, the heat exchanger comprises a heat pipe. The heat pipe comprises the working fluid. The working fluid comprises a mixture of a first working fluid having a first working temperature range and a second working fluid having a second, different working temperature range.

In some embodiments, the heat exchanger comprises a second heat pipe positioned adjacent the first heat pipe. The heat pipe comprises a working fluid operable at a first working temperature range and the second heat pipe comprises a second working fluid operable at a second working temperature range. The second working temperature range is relatively higher than the first working temperature range. The heat pipe may have a working fluid operable at a first pressure and the second heat pipe comprises a second working fluid operable at a second working pressure.

In some embodiments, the heat mover comprises a thermo-electric device configured to move heat toward the occupant in a heating mode and heat away from the occupant in a cooling mode. A controller is coupled to the heat mover and configured to transmit commands to the heat mover in order to control execution of the heating mode and the cooling mode. The heat sink is configured to provide heat to the heat transfer station via the heat exchanger in a heating mode. The heat conductor extends from the heat-transfer station outwardly to lie between the cushion and the trim.

In some embodiments, the occupant support comprises a plurality of heat transfer stations, and each heat transfer station is configured to be individually controlled.

In some embodiments, the heat transfer station includes a plurality of heat movers coupled to the conductor and a plurality of heat exchangers interconnecting the heat movers and the heat sink, each heat exchanger configured to remove heat from each heat transfer station.

According to another embodiment, an occupant support comprises a vehicle seat including a cushion and trim positioned around at least a portion of the cushion, and an occupant-comfort system. The occupant-comfort system includes a heat transfer station positioned in the seat cushion in spaced-apart relation to the trim and configured to selectively move heat to an occupant in a heating mode and away from the occupant in a cooling mode. A heat conductor is coupled to the heat transfer station and configured to communicate heat between the heat transfer station and the occupant and a heat sink located in spaced-apart relation to the cushion and the heat transfer station and configured to remove heat from the heat transfer station while the occupant-comfort system is in the cooling mode. The heat transfer station includes a heat mover coupled to the conductor and a heat exchanger interconnecting the heat exchanger and the heat sink, the heat exchanger is configured to remove heat from the heat transfer station.

In some embodiments, the heat exchanger comprises a heat pipe. The heat pipe comprises a working fluid. The working fluid is preselected to operate over a range of environmental temperatures including environmental freezing temperatures. The working fluid may be a mixture of a first working fluid having a first working temperature range and a second working fluid having a second, different working temperature range.

In some embodiments, the heat exchanger comprises a second heat pipe positioned adjacent the first heat pipe. The heat pipe includes a working fluid operable at a first working temperature range and the second heat pipe comprises a second working fluid operable at a second working temperature range, wherein the second working temperature range is relatively higher than the first working temperature range.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view of an occupant support adapted for use in a passenger vehicle showing that the occupant support includes a seat bottom mounted to a floor of the vehicle, a seat back mounted to the seat bottom, and each of the seat bottom and the seat back include an occupant-comfort system configured to be controlled with a controller to apply a cold or warm sensation to an occupant of the occupant support through a cushion cover of the occupant support;

DETAILED DESCRIPTION

Figure 1:
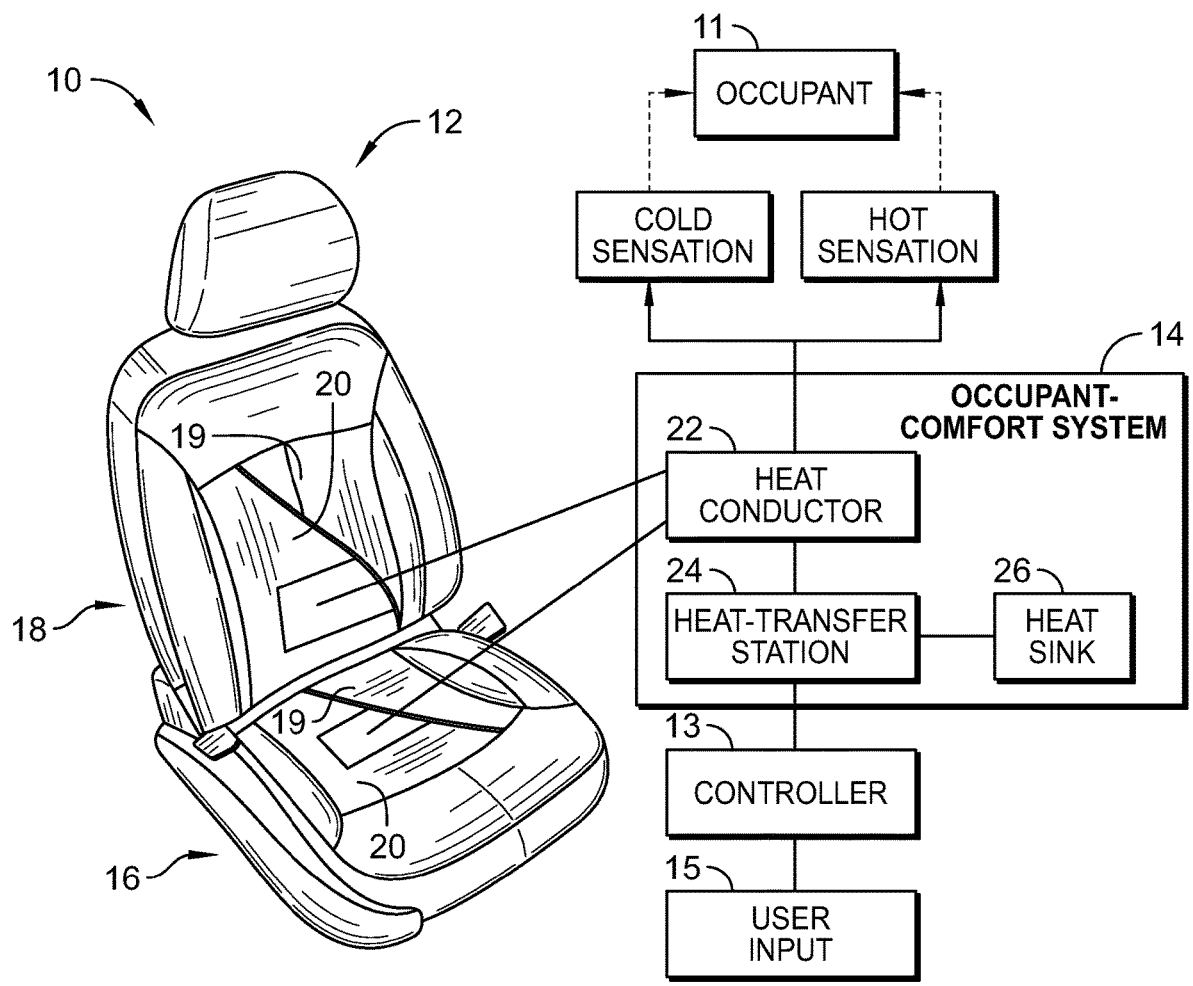

An occupant support 10, as illustrated in FIG. 1, includes a vehicle seat 12 and occupant-comfort system 14. The vehicle seat 12 is configured to support an occupant 11 within a vehicle and includes a seat bottom 16 arranged to overlie a vehicle floor and a seat back arranged to extend upward from the seat bottom 16. The occupant-comfort system 14 is coupled to at east one of the seta bottom 16 and the seat back 18 and is configured to provide the occupant 11 with a hot sensation in a heating mode and a cold sensation in a cooling mode. Controller 13 may receive user inputs 15 from the occupant 11 to operate the occupant-comfort system 14, and/or may receive temperature feedback inputs as part of an automated control mode.

Controller 13 may provide various thermal comfort options for occupant 11. For example, occupant-comfort system 14 in seat bottom 16 may be in the cooling mode while occupant-comfort system 14 seat back 18 may be inactive. In another example, thermoelectric occupant-comfort system 14 in seat bottom 16 may be inactive while occupant-comfort system 14 in seat back 18 may be in die heating mode or cooling mode.

Occupant-comfort system 14 includes a heat conductor 22, a heat transfer station 24, and a heat sink 26. Heat conductor 22 extends from heat-transfer station outwardly to lie between trim 19 and cushion 20. Examples of heat conductors, such as thermally conductive flexible strips, are disclosed in U.S. application Ser. No. 15/787,161, incorporated by reference in its entirety. Heat transfer station 24 provides the thermal sensation to the occupant 11. Heat transfer station 24 is configured to transfer heat between heat conductor 22 and occupant 11 while the occupant-comfort system 12 is operating in either the cooling mode or the heating mode. The heat sink 26 is positioned spaced apart from the heat transfer station 24 and the cushion 20, as shown, for example, in FIGS. 4-5. Heat sink 26 is configured to remove heat from the heat transfer station 24 when the occupant-comfort system 14 is in the cooling mode. However, in one example, the heat sink 26 may provide heat to the heat transfer station 24 while the occupant-comfort system 14 is in the heating mode.

Figure 2:
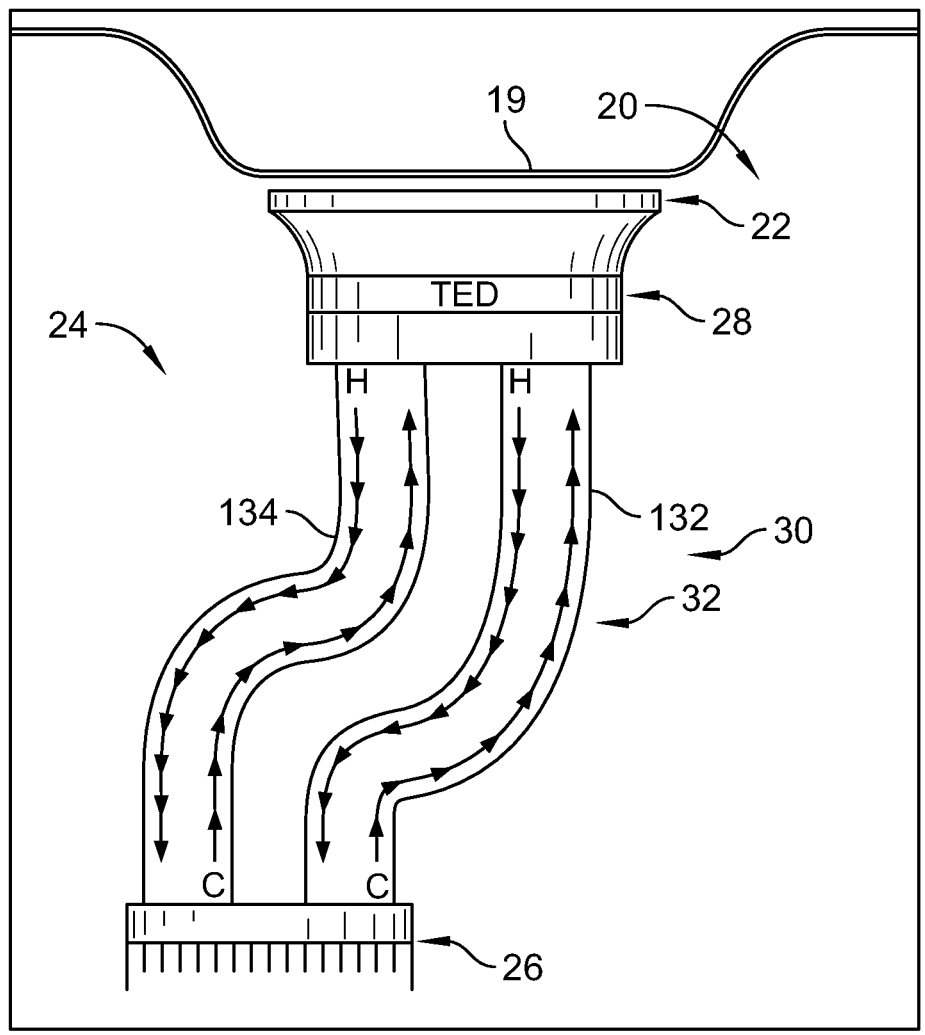
FIG. 2 is a diagrammatic view of a first embodiment of the occupant-comfort system showing that the occupant-comfort system includes a heat conductor, a heat sink, and a heat transfer station, and showing that the heat transfer station includes a heat mover and two heat pipes for moving heat form the heat conductor to the heat sink.

As illustrated in FIGS. 1-2, heat transfer station 24 comprises a heat mover 28 and a heat exchanger 30. Heat mover is, for example, a thermo-electric device configured to move heat toward the heat conductor 22 and occupant 11 in a heating mode and move that away from the occupant 11 and towards the heat exchanger 30 in a cooling mode. Heat mover 28 is positioned between the heat conductor 22 and the heat exchanger 30. Heat exchanger is positioned between the heat mover 28 and the heat sink 26.

Heat exchanger 30 includes at least one pipe 32 that that extends from the heat mover 28 to the heat sink 26 as illustrated in FIGS. 2-5. Heat pipe includes a working fluid interior to the pipe that transfers heat from the mover 28 to the heat sink 28 (or vice versa if needed). In some embodiments, the at least one heat pipe 32 is flexible.

The at least one heat pipe 32 containing the working fluid is configured to operate over a wide temperature range to allow movement of heat via the working fluid through the heat pipe 32 in extreme temperature conditions. For example. The working fluid heat pipe 32 is operable when the temperature of the environment surrounding the vehicle seat is above or below the environmental freezing point as well as above or below the freezing or boiling point of a working fluid in the heat pipe 32.

As illustrated in FIG. 2, heat pipe 32 may comprise a first heat pipe 132 and a second heat pipe 134, each coupled to the heat mover 28 and the heat sink 26. The first heat pipe 132 is operable over a first range of temperatures and the second heat pipe 134 is operable over a second range of temperatures, different then the first range of temperatures so that the overall heat exchanger 30 is operable over the combined range of first and second temperatures.

In some embodiments, the range is achieved by the first heat pipe 132 having a first pressure inside the pipe and the second heat pipe 134 having a second pressure inside the pipe that is either higher or lower than pressure inside the first heat pipe 132. In some embodiments, the first heat pipe 132 includes a working fluid with a relatively low working temperature range and the second heat pipe 134 includes a working fluid with a relatively high working temperature range. For example, working fluid in the first heat pipe 132 could have a relatively low boiling point and relatively low freezing point compared to a relatively high boiling and freezing point of a working fluid in the second heat pipe 134. In some embodiments, the working fluid in the first heat pipe 132 includes a mixture of at least two working fluids operable over a combined first working temperature range and the working fluid in the second heat pipe 134 includes a mixture of at least two working fluids operable over a combined second working temperature range different than the first working temperature range. Any combination of pressures, working fluids, and mixtures may be used in the first eat pipe 132 and second heat pipe 134 to arrive at the working temperature range. Examples of a first working fluid is water and a second working fluid is alcohol or glycol. Any suitable working fluids may be used.

Figure 3:
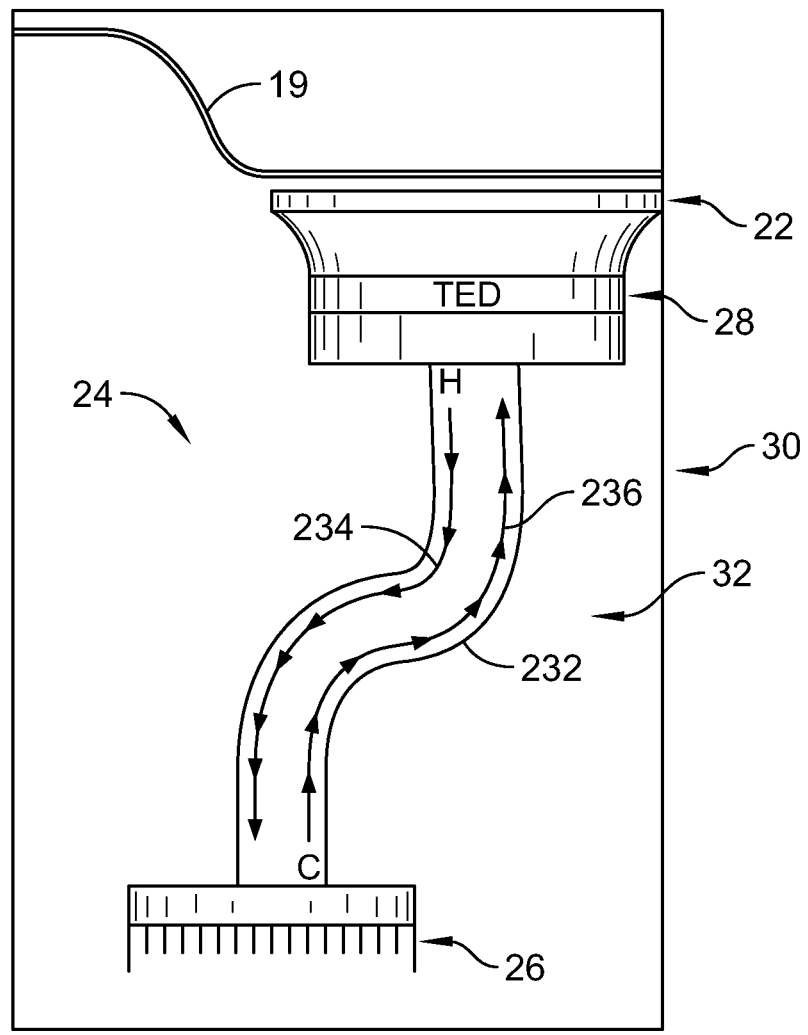
FIG. 3 is a diagrammatic view of an embodiment of the occupant-comfort system showing that the occupant-comfort system includes a heat conductor, a heat sink, and a heat transfer station, and showing the heat transfer station includes a heat mover and a single pipe having multiple working fluids for moving heat from the heat conductor to the heat sink.

As illustrated in FIG. 3, at least one heat pipe 32 comprises a single heat pipe 232 that includes a working fluid having a mixture of a first working fluid 236 operable at a first range of temperatures and a second working fluid 234, operable at a second, different range of temperatures to move heat from the heat mover 28 to the heat sink 26. Examples of a first working fluid is water and a second working fluid is alcohol or glycol. Any suitable working fluids may be used.

Figure 4:
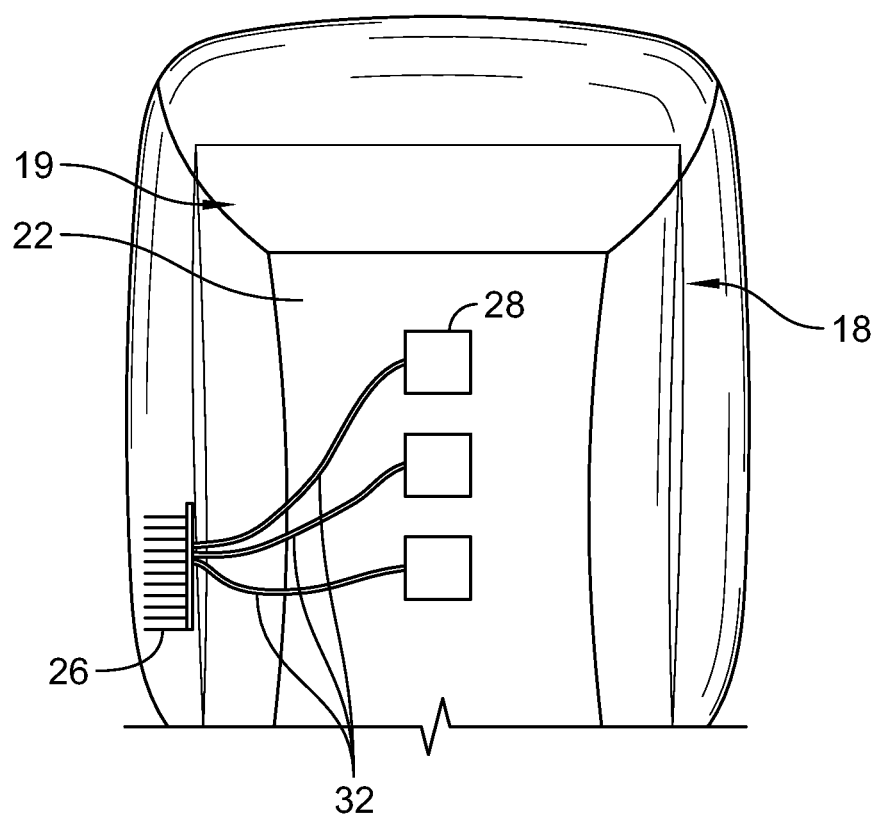
FIG. 4 is a diagrammatic view of a seat back and the occupant-comfort system of FIG. 1 showing that a plurality of heat-transfer stations are coupled to a single heat sink.
Figure 5:
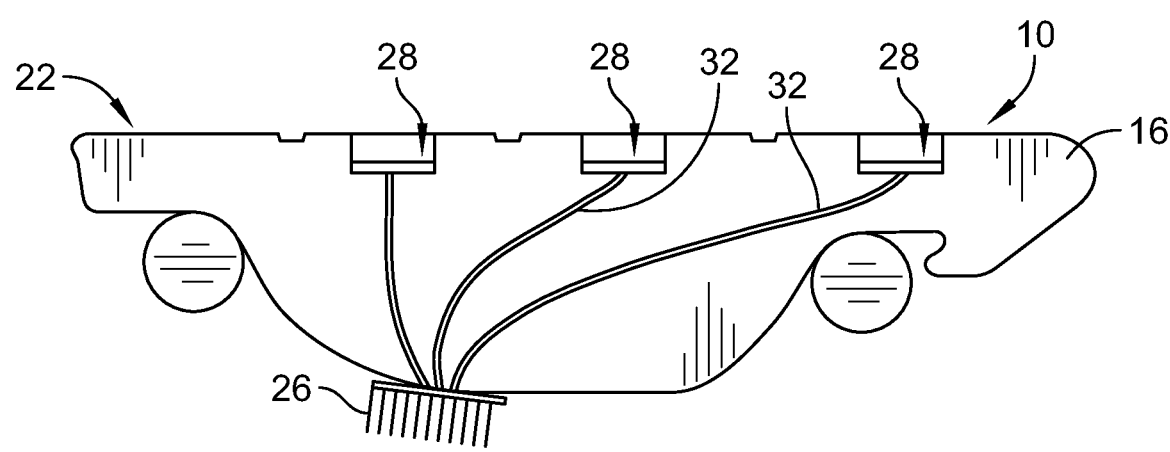
FIG. 5 is a diagrammatic view of a seat bottom and the occupant-comfort system unit of FIG. 1 showing a plurality of heat-transfer stations coupled to a single heat sink.

FIGS. 4-5 depict how a plurality of heat transfer stations and heat exchangers may be installed in a seat back 18 and seat bottom 16 of occupant support 10. One or more heat movers 28 may be installed in seat back 18 and in contact with a common conductor 22 or individually spaced apart conductors along the seat back 18. Heat movers 28 may each be coupled with a heat exchanger 30, as disclosed in FIGS. 2-3, and coupled to a common sink 26 positioned at a side or back opposite the conductor 22. Multiple heat movers 28 may be installed in the cushion in a seat bottom 16 and coupled to a common conductor 22 or individually spaced apart conductors along the seat bottom 16. Heat movers 28 may each be coupled with a heat exchanger 30, as disclosed in FIGS. 2-3, and coupled to a common sink 26 positioned at a side or bottom opposite the conductor 22.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. An occupant support comprising
a vehicle seat including a cushion and trim positioned around at least a portion of the cushion,
an occupant-comfort system including a plurality of heat transfer stations positioned in the cushion in spaced-apart relation to the trim and configured to selectively move heat to an occupant in a heating mode and away from the occupant in a cooling mode, a heat conductor coupled to each heat transfer station and configured to communicate heat between each heat transfer station and the occupant and a single heat sink located in spaced-apart relation to the cushion and each heat transfer station and configured to remove heat from each heat transfer station while the occupant-comfort system is in the cooling mode, each heat transfer station including a plurality of heat movers coupled to the conductor and a plurality of heat exchangers arranged to interconnect the plurality of heat movers and the single heat sink, and
at least one controller configured to transmit commands to each heat mover in order to control execution of the heating mode and the cooling mode,
wherein each heat mover comprises a thermo-electric device configured to move heat toward the occupant in the heating mode and heat away from the occupant in the cooling mode, the heat exchanger is configured to remove heat from the heat transfer station, the heat exchanger comprising a working fluid preselected to operate over a range of environmental temperatures including environmental freezing temperatures, and
wherein each heat transfer station is configured to be controlled individually.

2. The occupant support of claim 1, wherein each heat exchanger comprises a heat pipe.

3. The occupant support of claim 2, wherein the working fluid is located in a space formed in each heat pipe.

4. The occupant support of claim 3, wherein the working fluid comprises a mixture of a first working fluid having a first working temperature range and a second working fluid having a second, different working temperature range.

5. The occupant support of claim 2, wherein the heat pipe is a first heat pipe and each heat exchanger comprises a second heat pipe positioned adjacent to each first heat pipe.

6. The occupant support of claim 5, wherein the working fluid is operable at a first working temperature range and is located in a space formed in each heat pipe, a second working fluid is operable at a second working temperature range and is located in a space formed in each second heat pipe, and the second working temperature range is higher than the first working temperature range.

7. The occupant support of claim 5, wherein the working fluid operable at a first pressure is located in a space formed in each heat pipe and a second working fluid operable at a second pressure is located in a space formed in each second heat pipe.

8. The occupant support of claim 1, wherein a controller of the at least one controller is coupled to each heat mover.

9. The occupant support of claim 1, wherein the heat sink is configured to provide heat to each heat transfer station via at least one heat exchanger in a heating mode.

10. The occupant support of claim 1, wherein the heat conductor extends from each heat-transfer station outwardly to lie between the cushion and the trim.

11. An occupant support comprising
a vehicle seat including a cushion and trim positioned around at least a portion of the cushion,
an occupant-comfort system including a heat transfer station positioned in the cushion in spaced-apart relation to the trim and configured to selectively move heat to an occupant in a heating mode and away from the occupant in a cooling mode, a heat conductor coupled to the heat transfer station and configured to communicate heat between the heat transfer station and the occupant and a single heat sink located in spaced-apart relation to the cushion and the heat transfer station and configured to remove heat from the heat transfer station while the occupant-comfort system is in the cooling mode, the heat transfer station including a plurality of heat movers coupled to the heat conductor, a plurality of heat exchangers arranged to interconnect the plurality of heat movers and the single heat sink, each heat exchanger being configured to remove heat from each heat transfer station, each heat mover comprising a thermo-electric device configured to move heat toward the occupant in the heating mode and heat away from the occupant in the cooling mode, and
at least one controller configured to transmit commands to each heat mover in order to control execution of the heating mode and the cooling mode.

12. An occupant support comprising
a vehicle seat including a back cushion and a bottom cushion, and trim positioned around at least a portion of the back cushion and at least a portion of the bottom cushion,
an occupant-comfort system including at least one of (i) a plurality of heat transfer stations positioned in the back cushion in spaced-apart relation to the trim and configured to selectively move heat to an occupant in a heating mode and away from the occupant in a cooling mode, a heat conductor coupled to each heat transfer station and configured to communicate heat between each heat transfer station and the occupant and a heat sink located in spaced-apart relation to the back cushion and each heat transfer station and configured to remove heat from each heat transfer station while the occupant-comfort system is in the cooling mode, and (ii) a plurality of heat transfer stations positioned in the bottom cushion in spaced-apart relation to the trim and configured to selectively move heat to an occupant in the heating mode and away from the occupant in the cooling mode, a heat conductor coupled to each heat transfer station and configured to communicate heat between each heat transfer station and the occupant and a heat sink located in spaced-apart relation to the bottom cushion and each heat transfer station and configured to remove heat from each heat transfer station while the occupant-comfort system is in the cooling mode, each heat transfer station including a heat mover coupled to the heat conductor, a first heat exchanger interconnecting the heat mover and the heat sink, and a second heat exchanger interconnecting the heat mover and the heat sink, each heat mover comprising a thermo-electric device configured to move heat toward the occupant in the heating mode and heat away from the occupant in the cooling mode, and at least one controller configured to transmit commands to each heat mover in order to control execution of the heating mode and the cooling mode, wherein the first heat exchanger has a first working fluid operable at a first working temperature range, the second heat exchanger has a second working fluid operable at a second working temperature range, the second working temperature range is higher than the first working temperature range.

13. The occupant support of claim 12, wherein each heat exchanger comprises a heat pipe.

14. The occupant support of claim 13, wherein each working fluid is located in a space formed in each respective heat pipe.

15. The occupant support of claim 14, wherein the first working fluid is preselected to operate over a range of environmental temperatures including environmental freezing temperatures.

\* \* \* \* \*